UNITED STATES PATENT OFFICE.

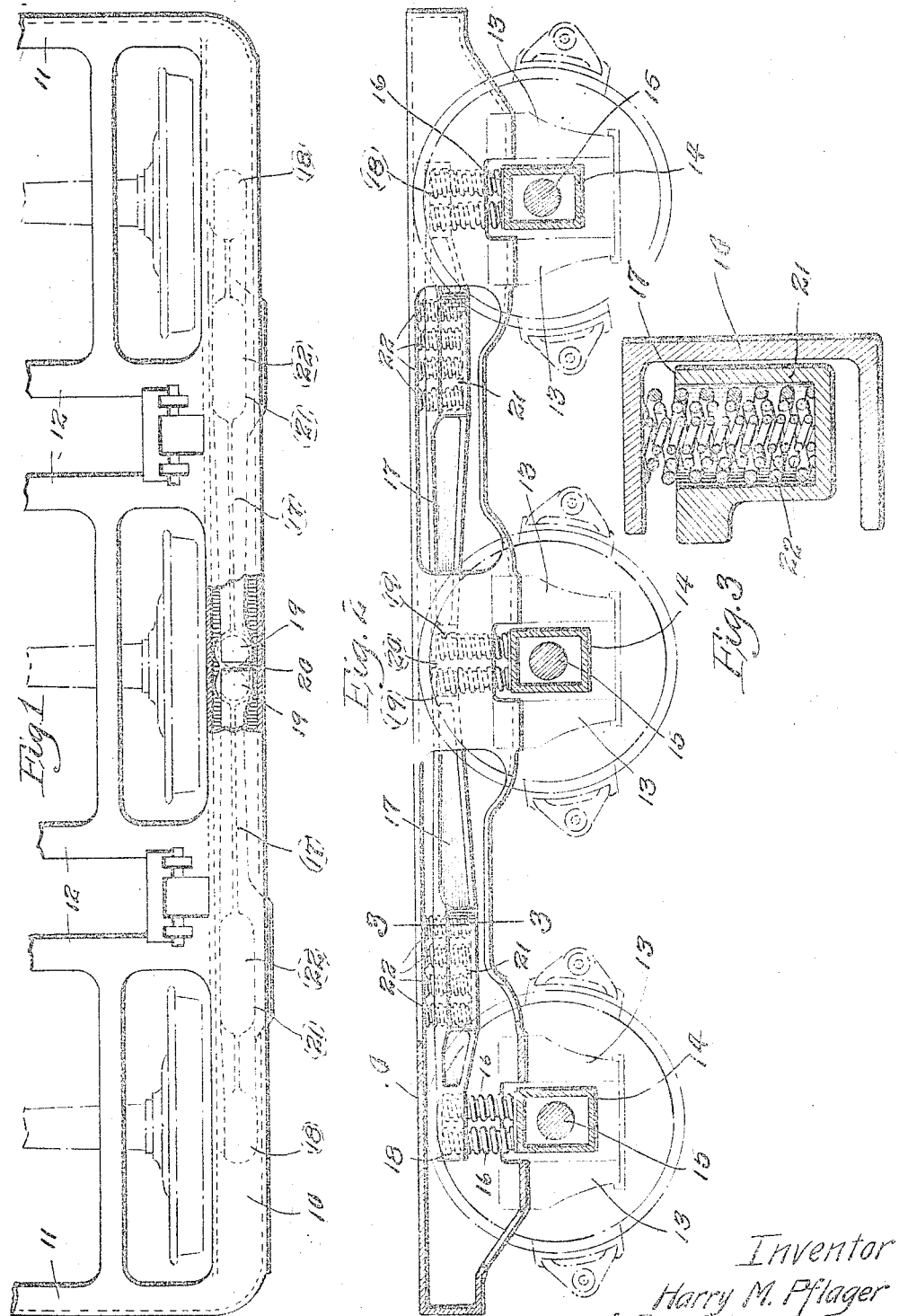

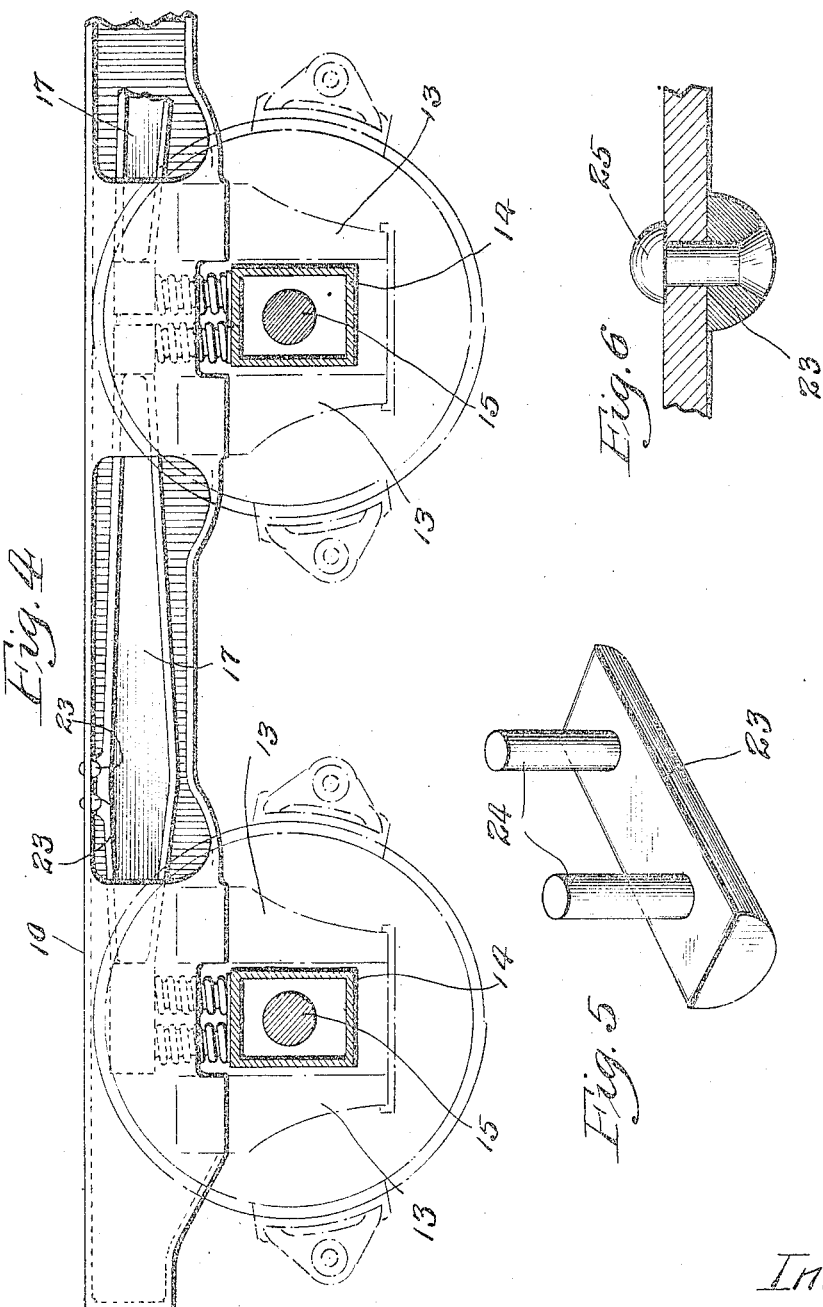

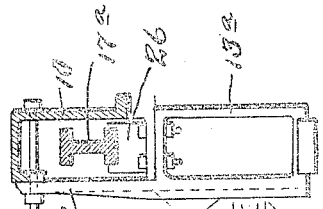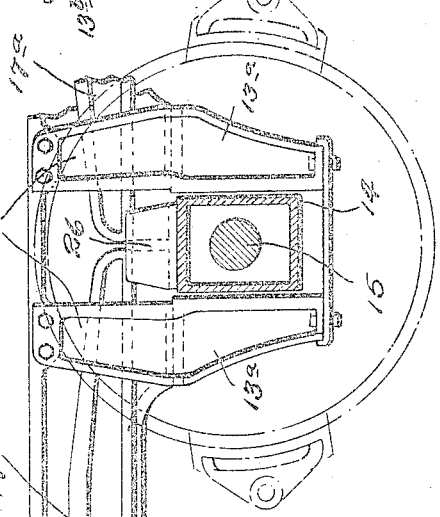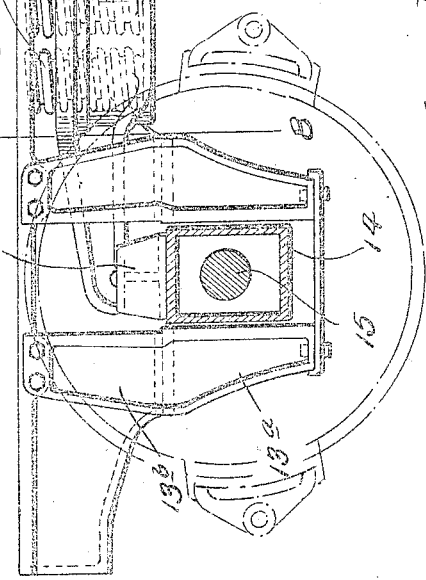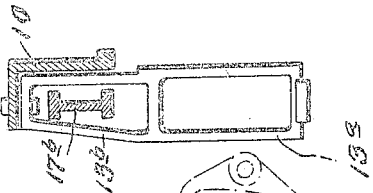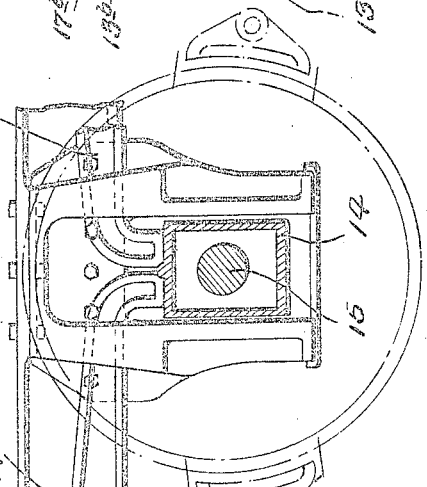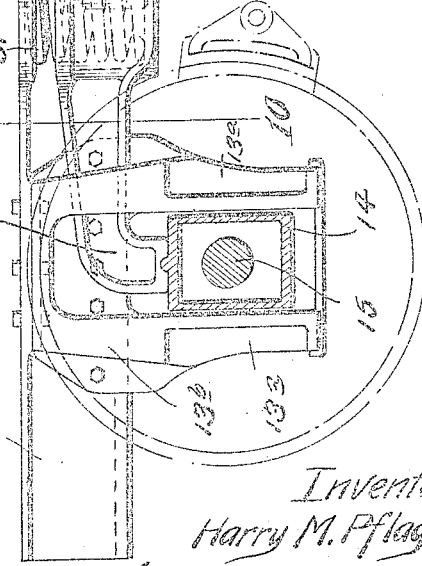

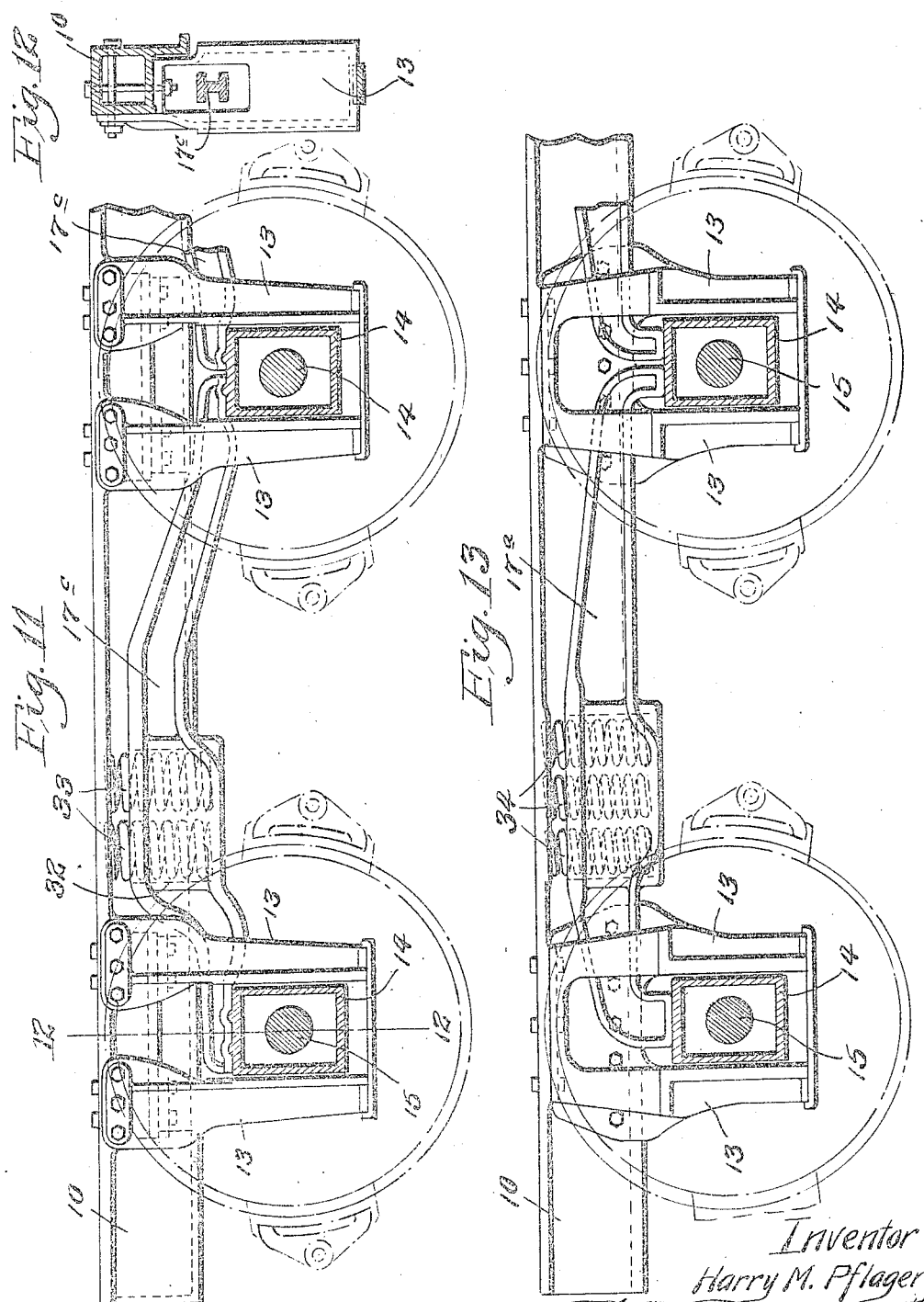

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,278,739.            Specification of Letters Patent.            Patented Sept. 10, 1918.

Application filed July 6, 1917. Serial No. 179,066.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to a new and improved spring equalizer arrangement for yieldingly supporting the truck frame upon the journal boxes, which latter it will be understood contain the bearings for the wheel carrying axles, and this application should be read and considered in connection with Patents Nos. 1,080,555, 1,080,556, 1,080,557, 1,080,558 and 1,080,559, issued to the assignee of Clarence H. Howard and myself December 9, 1913.

The principal objects of my invention are, to provide increased flexibility of the truck and equalize the distribution of weight upon all of the truck wheels; to provide a comparatively simple truck frame support which, by virtue of its arrangement and construction, will be effective in distributing and absorbing shocks and vibration due to track irregularities and preventing said shocks and vibration from being transmitted to the car body, thereby making the riding movement of said body more easy and gentle; and to dispose the flexible supporting means so that it will in nowise interfere with the free inspection, repair and adjustment of the brakes and brake rigging associated with the truck and the wheels thereof.

With the foregoing and other objects in view, my invention consists in a plurality of substantially rigid or non-elastic equalizing members disposed within or adjacent to the substantially hollow wheel pieces of the truck frame, and springs preferably of the helical compression type disposed between said equalizing members and the truck frame and the journal boxes associated therewith, said equalizing members being made hollow at certain points or provided with comparatively deep pockets which inclose certain of the helical springs associated with said equalizing members.

My invention further consists in certain novel features of construction and arrangement of parts hereinafter more fully described and claimed and illustrated in the accompanying drawings, in which—

Figure 1 is a plan view of the side portion of a truck frame which is equipped with the flexible support contemplated by my invention;

Fig. 2 is a side elevational view of the truck frame, parts thereof being broken away and showing my improved supporting means associated therewith;

Fig. 3 is a cross section taken approximately on the line 3—3 of Fig. 2;

Fig. 4 is an elevational view of the end portion of a truck frame and showing a modified form of the flexible supporting means;

Fig. 5 is a perspective view of a fulcrum bearing for the equalizing member utilized in the modified form which is illustrated in Fig. 4;

Fig. 6 is a sectional view of a modified form of the fulcrum;

Fig. 7 is an elevational view of the end portion of a truck frame and showing a further modified form of the flexible support;

Fig. 8 is a cross section taken approximately on the line 8—8 of Fig. 7;

Fig. 9 is an elevational view of the end portion of a truck frame and showing a further modified form of the flexible supporting means;

Fig. 10 is a vertical section taken approximately on the line 10—10 of Fig. 9;

Fig. 11 is an elevational view of the end portion of a truck frame and showing a further modified form of the flexible supporting means;

Fig. 12 is a vertical section taken approximately on the line 12—12 of Fig. 11;

Fig. 13 is an elevational view of a further form of the flexible supporting means.

Referring by numerals to the accompanying drawings and particularly to Figs. 1 to 3 inclusive, 10 designates the wheel piece of an accepted type of six wheel truck frame, the same being preferably of integral construction and including end pieces 11 and transom members 12.

Rigidly fixed to and depending from the wheel pieces are pedestal jaws 13 between which are positioned the usual journal boxes 14 which contain the bearings for the ends of the wheel carrying axles 15.

The wheel pieces 10 of the truck frame are preferably hollow and of box-like form in cross section with the bottom wall or plate cut away at points between the pedestal jaws for the accommodation of the journal boxes and the springs mounted thereupon.

The outer wall of the wheel piece is cut away at suitable points, preferably between the pairs of pedestal jaws, to permit the ready insertion or removal of the equalizer members and springs constituting my improved flexible support.

Supported by the journal boxes 14 and extending upward into the substantially hollow wheel pieces are sets of helical compression springs 16, preferably of the nested type, that is, there are two or more springs of different sizes arranged one within the other for each set. Arranged within each wheel piece is a pair of substantially rigid or non-elastic equalizing members 17 and formed in the underside of the outer end of each member is a pocket 18 which incloses the upper portions of those springs which are located on the corresponding one of the end or outer journal boxes.

The inner ends of the equalizing members 17 terminate immediately adjacent to each other at a point directly above the center of the middle one of the journal boxes and formed in the undersides of said inner ends are pockets 19 which receive the upper portions of the sets of springs which are supported by the central journal box, and a plate 20 which is positioned on top of said last mentioned sets of springs.

Formed in each equalizing member 17 is a pocket 21 in which is located a series of sets of helical compression springs 22, the upper ends thereof bearing directly against the underside of the top plate of the hollow wheel piece.

The distance from the center of each pocket 18 to the center of the pocket 21 is approximately half the distance from the center of said pocket 21 to the center of the pocket 19 at the inner end of the equalizing member, such arrangement being necessary to properly equalize the weight of the truck frame and parts carried thereby upon the journal boxes.

The pocket 21 is of substantial depth; in fact, it extends practically to the bottom of the body of the equalizing member 17, and thus the walls surrounding said pockets serve as a housing for the greater portions of the springs positioned in said pocket.

In the modified construction illustrated in Figs. 4, 5 and 6, the ends of the equalizing member rest upon helical springs, which latter are supported by the journal boxes and the upper portion of said equalizing member bears directly against and fulcrums upon a pair of transversely disposed bars 23 which are fixed to the underside of the top plate of the hollow wheel piece. These bars are preferably half round in cross section and occupy corresponding recesses formed in the top of the equalizing member.

In Fig. 5 I have shown one of the fulcrum members provided with a pair of integral shanks or pins 24 which pass through the top plate of the hollow wheel piece of the truck frame and the upper ends of said shanks or pins being riveted down onto said top plate to firmly secure said fulcrum member. Another form of fastening for the fulcrum member is illustrated in Fig. 6, where a rivet 25 passes through the top plate of the wheel piece and the body of said fulcrum member.

In the modified construction illustrated in Figs. 7 and 8, the ends of the equalizing member $17^a$ bear directly upon blocks 26 which rest directly upon the journal boxes and said equalizing member is provided with a comparatively deep pocket 27 which receives two or more sets of helical compression springs 28, the latter bearing against the underside of the top plate or flange of the truck frame wheel piece. In this construction the pedestal jaws $13^a$ are extended upward as designated by $13^b$, the upper ends of said extensions being rigidly fixed in any suitable manner to the upper portion of the wheel piece and the equalizing member $17^a$ passes between this extension and the vertical wall of the wheel piece. (See Fig. 8.)

In the modified construction illustrated in Figs. 9 and 10, the wheel piece of the truck frame is substantially Z-shape in cross section with the top flange outwardly presented and the equalizing member $17^b$ lies beneath this top flange with its ends curved downward as designated by 29 and bearing directly upon the journal box. In this construction, the outer portions of the pedestal jaws are extended upward and secured to the top flange of the wheel piece and the end portions of the equalizing member lie between these upward extensions and the vertical web of the wheel piece. The equalizing member in this form is provided with a cup-shaped pocket 30 which serves as a receptacle and housing for a single large helical spring 31 or a series of nested springs, the upper ends of which bear directly against the underside of the top flange of the wheel piece.

In the modified construction illustrated in Figs. 11 and 12, the ends of the equalizing member $17^c$ bear directly upon the journal boxes and said equalizing member is provided with a cup-shaped pocket 32 of substantial depth and sufficient length to accommodate two or more sets of helical compression springs 33.

In the modification illustrated in Fig. 13, the equalizing member $17^d$ is provided with a pocket of sufficient length to accommodate three or more sets of helical compression springs 34, the upper ends thereof bearing directly against the top plate of the wheel piece.

By my improved spring and equalizer arrangement, a truck frame supporting structure is provided which is yielding and resilient to a comparatively high degree with the result that service shocks and vibration due to the passage of the truck wheels over rough track, switches, crossings and the like are practically absorbed and eliminated and the riding movement of the supported car body is rendered more easy and gentle.

The improved spring and equalizer arrangement is effective in materially increasing the flexibility of the truck and equalizing the distribution of the carried weight upon all of the truck wheels. Furthermore, where the springs and equalizing members are located within the hollow wheel pieces of the truck frame, they are practically inclosed and consequently protected from injury, and further such arrangement leaves the brake beams, brake shoes and brake rigging free for inspection and readily accessible in the event of repairs and adjustments.

The pockets formed in the equalizing members are of substantial depth, with the result that the walls around said pockets form housings for the springs, and those springs located between the equalizing members and the truck frame provide yielding and resilient fulcrums for said equalizing member.

While I have illustrated and described my invention as being particularly applicable for six wheel trucks, it will be understood that practically the same arrangement can be advantageously utilized in connection with trucks having other wheel arrangements.

It will be readily understood that minor changes in the size, form and construction of the various parts of my improved car truck can be made and substituted for those herein shown and described, without departing from the spirit of my invention, the scope of which is set forth in the appended claims.

I claim:

1. A flexible support for railway car trucks comprising substantially rigid equalizing members resiliently supported upon the journal boxes associated with the truck, and helical springs interposed between said equalizing members and the truck frame at points intermediate their ends.

2. A flexible support for railway car trucks comprising substantially rigid equalizing members resiliently supported upon the journal boxes associated with the truck, and helical springs interposed between said equalizing members and the truck frame at points intermediate their ends, portions of which equalizing members serve as housings for said helical springs.

3. A flexible support for railway car trucks comprising substantially rigid equalizing members resiliently supported upon the journal boxes associated with the truck, helical compression springs arranged between the equalizing members and the truck frame, and said equalizing members being provided with pockets which contain said springs.

4. The combination with a car truck frame and its journal boxes, of helical springs supported by said journal boxes, substantially rigid equalizing members supported by said helical springs, helical compression springs interposed between the equalizing members and the truck frame, and said equalizing members being provided with integrally formed housings for said last mentioned springs and with integrally formed housings for the upper portions of the springs which are supported by the journal boxes.

5. The combination with a truck frame and its journal boxes, of substantially rigid equalizing members having their ends supported by the journal boxes, a portion of each equalizing member intermediate its ends being substantially U-shape in cross section, and springs arranged in the U-shaped portions of the equalizing members and serving as yielding supports for the truck frame and yielding fulcrums for the equalizing members.

6. A flexible support for railway car trucks comprising helical springs mounted upon the journal boxes associated with the truck, equalizing members arranged with their ends bearing upon said helical springs, and helical springs bearing upon said equalizing members between their ends, which last mentioned helical springs serve as supports for the truck frame.

7. The combination with a truck frame and its journal boxes, of helical springs arranged on said journal boxes, substantially rigid equalizing members supported by said springs, and springs interposed between said equalizing members and the truck frame, which last mentioned springs serve as resilient supports for the truck frame and as shielding fulcrums for the equalizing members.

In testimony whereof I hereunto affix my signature this 26th day of June, 1917.

HARRY M. PFLAGER.